United States Patent [19]

Ford

[11] 4,431,502
[45] Feb. 14, 1984

[54] SEALING MEANS FOR FILTER PRESS CELLS

[75] Inventor: James M. Ford, Cleveland, Tenn.

[73] Assignee: Olin Corporation, New Haven, Conn.

[21] Appl. No.: 329,092

[22] Filed: Dec. 9, 1981

Related U.S. Application Data

[63] Continuation-in-part of Ser. No. 204,127, Nov. 5, 1980.

[51] Int. Cl.³ .................. C25B 9/00; C25B 11/10; C25B 13/08
[52] U.S. Cl. .................................. 204/252; 204/279; 204/290 F; 204/296
[58] Field of Search .............. 204/252, 279, 295, 296, 204/290 F, 253–258

[56] References Cited

U.S. PATENT DOCUMENTS

| | | | |
|---|---|---|---|
| 3,980,544 | 9/1976 | Adams et al. | 204/253 X |
| 4,026,782 | 5/1977 | Bouy et al. | 204/254 |
| 4,175,025 | 11/1979 | Creamer et al. | 204/253 |
| 4,207,165 | 6/1980 | Mose et al. | 204/258 |
| 4,210,516 | 7/1980 | Mose et al. | 204/284 |
| 4,253,932 | 3/1981 | Mose et al. | 204/279 X |
| 4,342,460 | 8/1982 | Eng | 204/279 X |
| 4,378,286 | 3/1983 | Eng et al. | 204/279 X |

Primary Examiner—Donald R. Valentine
Attorney, Agent, or Firm—James B. Haglind; Donald F. Clements

[57] ABSTRACT

The invention relates to an electrolytic cell which is comprised of a first frame member housing an electrode and a second frame member housing an electrode. A separator is positioned between the first frame member and the second frame member. A first sealing means contacts a side of the first frame member and one side of the separator. Contacting the second frame member and the opposite side of the separator is a second sealing means. The first sealing means and the second sealing means are elastomeric solids having a substantially rectangular cross-sectional area where the first sealing means is from about 1.1 to about 3 times the width of the second sealing means. Pressing means are provided which press the frames together against the sealing means and the separator to form a substantially fluid-tight seal. The novel electrolytic cells provide the advantages of simultaneously:
 a. controlling gasket compression pressures,
 b. controlling gasket frame surface structural forces,
 c. efficiently forming a seal, and
 d. preventing gasket slippage.

9 Claims, 7 Drawing Figures

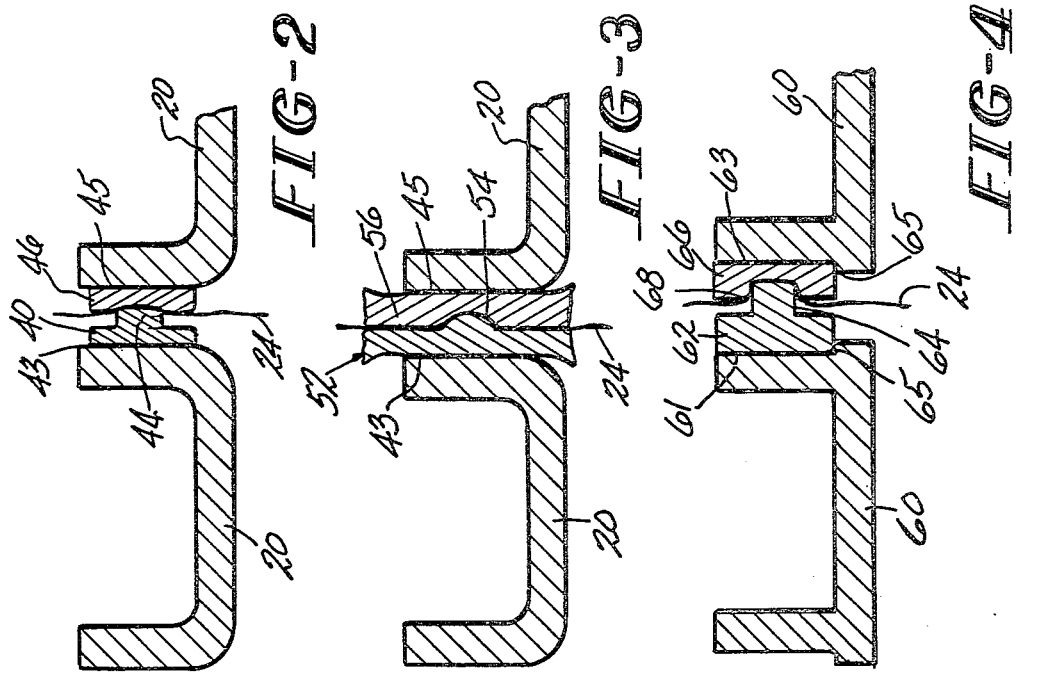
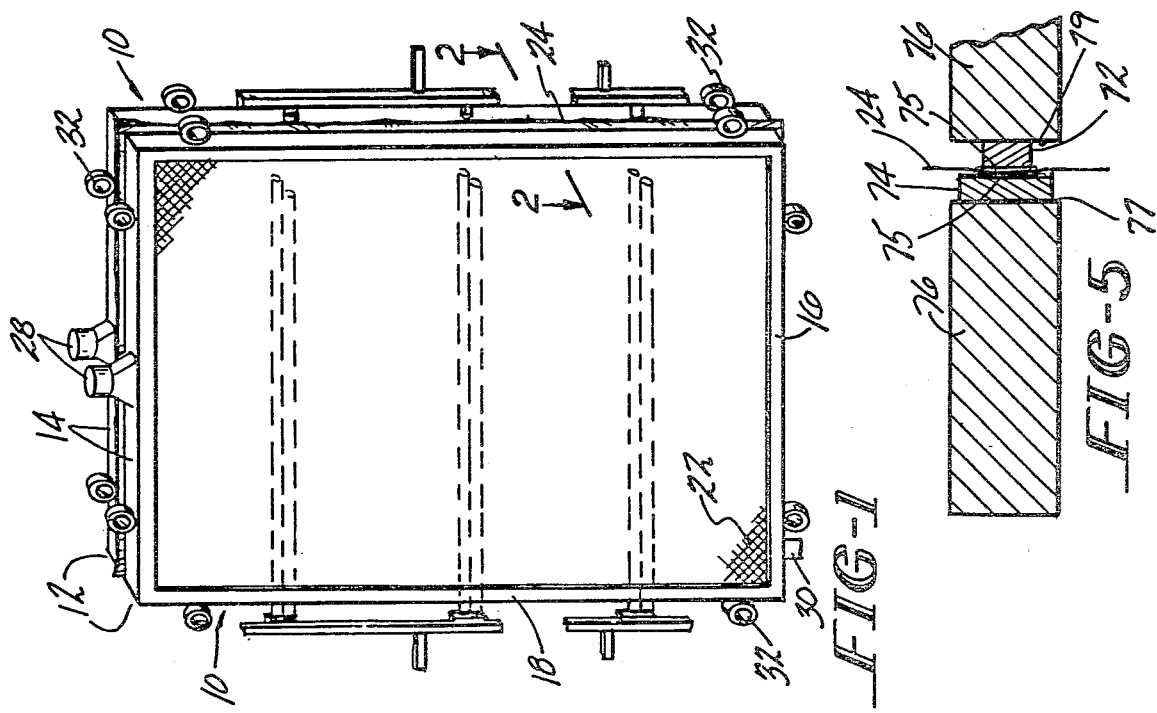

SEALING MEANS FOR FILTER PRESS CELLS

This application is a continuation-in-part of application Ser. No. 204,127, filed Nov. 5, 1980.

The present invention relates to spacer means suitable for use in a filter press-type electrolytic cell. More particularly, the invention relates to spacer means utilized to maintain a fixed and predetermined gap between the adjacent electrode frames in an electrolytic cell.

Commercial cells for the production of chlorine and alkali metal hydroxides have been continually developed and improved over a period of time dating back to at least 1892. In general, chlor-alkali cells are of the deposited asbestos diaphragm type or the flowing mercury cathode type. During the past few years, developments have been made in cells employing separators having ion exchange properties which promise advantages over either diaphragm or mercury cells. It is desirable to take advantage of existing technology, particularly in diaphragm cells, but it is also necessary to provide cell designs which meet the requirements of these newer separator materials. Since suitable separator materials, such as those marketed by E. I. duPont de Nemours and Company under the trademark Nafion ® and by Asahi Glass Company Ltd. under the trademark Flemion ®, are available primarily in sheet form, the most generally used cell employing such separators are of the "filter press" type. Filter press cells may employ electrode structures which are monopolar or bipolar.

In the filter press cell, separators in sheet form are clamped between the sides of frame members. The sealing means employed, normally elastomeric gaskets, must effectively provide a fluid-tight seal between the frame members and the separator without damaging the separator. Part of the difficulty in obtaining a fluid-tight seal has been found to reside in the fact that the gaskets utilized to separate the electrode frame members are available with thicknesses that widely vary because of large manufacturing tolerances.

It has been found in the assembly of filter press membrane cells that this difference in thickness between the gaskets employed on adjacent electrode frame members can present problems when attempting to compress the frames into a fluid-tight cell. Frequently, hydraulic rams or other types of pressure-applying apparatus are employed to compress the electrode frames and the separating gaskets together. Where there are differences in the thickness of the gaskets, it has been found that each gasket is not subjected to an equal level of compression. The thicker gaskets are naturally subjected to greater compression than thinner gaskets. Where the difference in thickness is too great, a predetermined compression force applied to a cell and its component electrode frames can leave spaces between the thinner gaskets and adjacent frames so that fluid leakage will occur. To correct this, additional pressure must be applied to the electrode frames to achieve a level of compression in the separating gaskets that will form a fluid-tight seal. Frequently, during this additional compression-applying step, excessive force can be applied which causes the frames to deform or bend. Additionally, if the gaskets employed are not properly aligned, slippage can occur resulting in unequal stress on portions of the separator and the gaskets resulting in undesired wear and the promotion of tearing of the membrane and unequal distribution of the compression loads on the sealing means resulting in fluid leaks. To correct, for example, a 10/1,000ths of an inch spacing gap between a gasket and an adjacent frame that is causing fluid leakage, it has been found necessary to tighten all of the gaskets 10/1,000ths of an inch to stop the leak.

Sealing means, including gaskets and other appropriate apparatus, for cells employing ion exchange membranes as separators included those described in U.S. Pat. No. 4,026,782, issued May 31, 1977, to P. Bouy et al, U.S. Pat. No. 4,175,025, issued Nov. 20, 1979, to E. D. Creamer et al, and U.S. Pat. No. 4,207,165, issued June 10, 1980, to Mose et al. U.S. Pat. No. 4,026,782 teaches bipolar cells having frames with recesses into which the sealing members fit. In one of the recesses, a diaphragm is sealed into the frame with a putty or caulked gasket. This sealing arrangement requires a complex frame structure which utilizes spacer apparatus that is part of one of the electrode frames. This arrangement suffers from the disadvantage of not being able to vary the gap between the electrode frames with simply the replacement of the sealing means should it be necessary to have a different gap between the electrode frames.

U.S. Pat. No. 4,175,025 describes filter press frames having at least one formed recess into which a gasket is fit. The membrane is sized to extend beyond the edges of the frame so that shrinkage of the membrane during regeneration will not prevent its re-use. Adjacent frames may contain recesses which are opposite each other, but of different sizes. Gaskets having different hardnesses are used to seal the membrane between them. The gap between the electrode frames in this type of sealing arrangement is entirely dependent upon the gasket height and the amount of compression applied to the frames. Thus, the gap can vary between each pair of adjacent frames as the thickness of the gaskets employed varies or the recesses machined into the frames vary.

To provide recesses in the frame members of the type disclosed in U.S. Pat. Nos. 4,026,782 and 4,175,025, operations such as machining must be employed. These operations add undesired increases to the cost of producing the frames.

The arrangement disclosed in U.S. Pat. No. 4,207,165 employs a fixed spacer member between the adjacent electrodes to establish a desired gap. However, the method of securing the membrane between the gasket members can promote tearing of the membrane or separator.

It is an object of the present invention to provide sealing means in filter press cells using frames which are simple and in which direct contact between the separator and the frame member is avoided.

Another object of the present invention is to provide sealing means which prevent undesired slippage between the sealing means and the slippery surfaces of the separator which is wet with electrolytes such as caustic solutions.

A further object of the present invention is to provide sealing means which contribute to the control of the compression pressures employed.

These and other objects of the invention are accomplished in an electrolytic cell comprising:
  a. a first frame member housing an electrode,
  b. a second frame member housing an electrode,
  c. a separator positioned between the first frame member and the second frame member,
  d. a first sealing means contacting a side of the first frame member and one side of the separator; the first sealing means being an elastomeric solid having a substantially rectangular cross-sectional area, e. a second sealing means contacting a side of the second frame member and contacting the other side of the separator, the second sealing means being an elastomeric solid having a substantially rectangular cross-sectional area, the width of the first sealing means being from about 1.1 to about 3 times the width of the second sealing means, and f. pressing means for pressing the frames together against the sealing means and the separator so as to form a substantially fluid-tight seal.

Other advantages of the invention will become apparent from reading the description below and the invention will be better understood by references to the attached drawings in which:

FIG. 1 illustrates a front elevation in perspective of a pair of adjacent electrodes employing the novel sealing means of the present invention.

FIG. 2 is an enlarged partial sectional view of the electrodes of FIG. 1 taken along line 2—2 showing one embodiment of the sealing means of the present invention.

FIG. 3 depicts a partial sectional view of another embodiment of the sealing means of the present invention.

FIG. 4 illustrates a partial sectional view of an additional embodiment of the sealing means of the present invention.

FIG. 5 shows a partial sectional view of a further embodiment of the sealing means of the present invention used with bar shaped frames.

Figure 6:
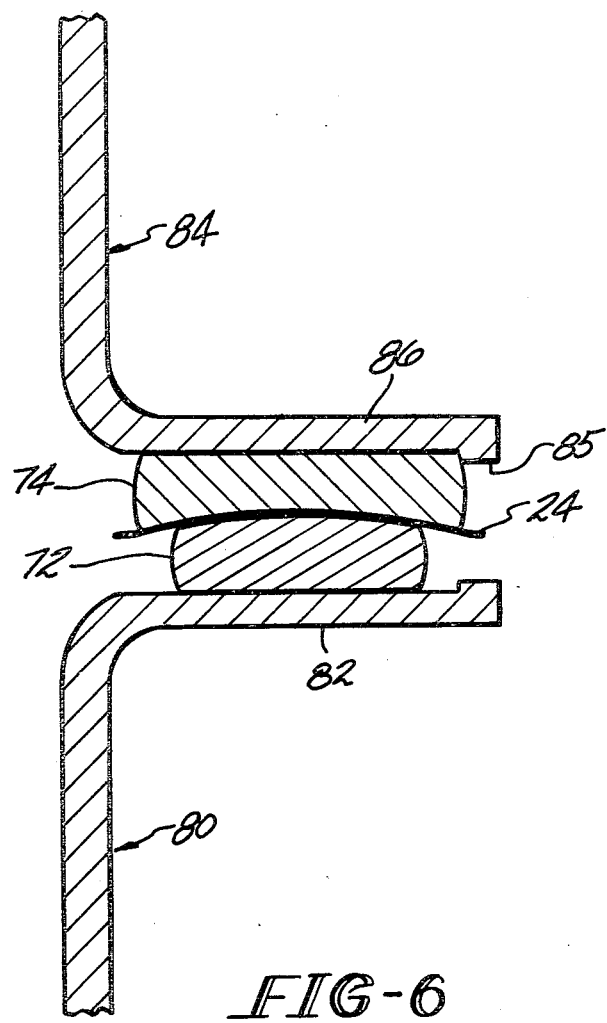
FIG. 6 illustrates a partial sectional view of a still further embodiment of the sealing means of the present invention in which a first sealing means has a width greater than a second sealing means.

Electrodes 10 of FIG. 1 are comprised of frames 12 having tops 14, bottoms 16, and sides 18 and 20. Frames 12 house foraminous electrode surfaces 22. Separator 24 is positioned between adjacent electrodes 10. Electric current is supplied to and removed from electrodes 10 through electrode connectors 24 connected to conductor rods 26 which are attached to electrode surfaces 22. Outlets 28 in tops 14 of frames 12 permit removal of electrolysis products. Inlets 30 permit a liquid to be fed to electrode 10. Guides 32 are included on frames 12 to allow for the proper alignment of electrodes 10.

FIG. 2 shows separator 24 positioned between gaskets 40 and 46 which are placed between sides 20 of frames 12. Gasket 40 is comprised of a base portion which contacts edge 43 of side 20 and raised portion 44 which contacts one side of separator 24. Gasket 46 contacts edge 45 of adjacent side 20 and the other side of separator 24. The area of contact for gasket 46 with separator 24 is greater than that of raised portion 44 of gasket 40.

In the embodiment of FIG. 3, separator 24 is sealed between gaskets 52 and 56 which extend beyond edges 43 and 45 of sides 20 of frames 12. Under compression, separator 24 is effectively sealed between raised portion 54 of gasket 52 and gasket 56.

FIG. 4 illustrates an additional embodiment of the sealing means of the present invention in which the bases of gaskets 62 and 66 rest against shoulders 65 of edges 61 and 63 of frames 60. Separator 24 is sealed, during compression, between raised portion 64 of gasket 62 and inset portion 68 of gasket 66.

FIG. 5 shows separator 24 sealed between inserts 75 which prevent undesired friction between separator 24 and narrow gasket 72 and wider gasket 74. Gaskets 72 and 74 are positioned between sides 77 and 79 of bar shaped frames 76.

FIG. 6 illustrates separator 24 sealed directly between compressed narrow gasket 72 positioned along side 82 of metal anode frame 80 and compressed wide gasket 74 positioned along side 86 of cathode frame 84. Lip 85 on side 86 retains wide gasket 74 within frame 84.

Figure 7:
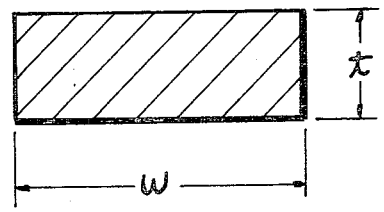
FIG. 7 represents a partial sectional view of a sealing means of the present invention.

FIG. 7 represents a partial sectional view of an uncompressed sealing means of the present invention having a rectangular cross-section where w is the initial width and t is the initial thickness of the sealing means.

Suitable as sealing means are gaskets comprised of elastomeric solids having a substantially rectangular cross-sectional area. Examples of the elastomeric solids include chlorobutadiene rubber (Neoprene), chlorosulfonated polyethylene (Hypalon), ethylene-propylene dimonomer (EPDM), or gum rubber. The hardness of the sealing means is not critical and any suitable hardness may be selected independently for either gasket. Preferably, the gaskets have a low degree of hardness which allows the gaskets to fill in irregularities on the frame members and thus permit reduced tolerances which minimizes, for example, machining of metal frames and thus reduces production costs. For example, elastomeric sealing means having a hardness of from about 20 to about 60 and preferably from about 30 to about 50 durometers are quite suitable; with the sealing means along the cathode frame being preferably in the range of from about 30 to about 40 durometers, while the sealing means along the anode frame is preferably from about 40 to about 50 durometers.

Gasket thicknesses are similarly not critical and any suitable thicknesses may be independently selected for each of the gaskets used.

In the embodiments shown in FIGS. 5 and 6 where both sealing means are substantially flat, solid gaskets having a rectangular cross-sectional area the initial width of the second gasket is selected to provide less area of contact with the separator than the initial width of the first gasket. Further, the width of the second gasket is selected to provide the desired control of the gasket compression pressures and the gasket frame surface structural forces. Control of these pressures minimizes compression set for gasket materials and bending or twisting of frame members. The initial width and initial thickness of an uncompressed sealing means having a rectangular cross-sectional area is shown in FIG. 7.

The width of the second gasket is kept narrow enough not to exceed the structural strength of the frame member. The force on the frame member per lineal inch of frame member is $F_i = P \times W$ where P is the gasket pressure of the second gasket and W is the expanded width of the second gasket in compression.

The expanded width $W = w \div (1-c)$ where w is the initial width of the second gasket and c is the fractional compression expressed as a decimal. The compression factor c is selected high enough to assure sealing, depending upon the gasket material and may be from about 0.05 to about 0.55 and preferably from about 0.2 to about 0.4.

To prevent the second sealing means from curling during compression and to control the amount of overhang of the first sealing means, the first sealing means has an initial width of from about 1.1 to about 3, and preferably from about 1.3 to about 2 times that of the second sealing means. Thus, for example, at initial widths normally employed in the cell, the first sealing means is from about ⅛ to about ½, and preferably from about ⅛ to about ¾ of an inch wider than the second sealing means. Curling of the sealing means along, for example, a metal anode frame, in addition to causing an uneven distribution of compression forces, can expose the metal anode frame to the attack of acidic brine, for example, an alkali metal chloride such as sodium chloride, which can promote crevice corrosion in the metal anode frame.

To prevent the sealing means from rolling up during assembly of the cell, a glue or adhesive may be applied to the side of the sealing means which contacts the frame members.

During assembly of a filter press electrolytic cell, pressing means such as tie bolts are tightened around the perimeter of the cell. This tightening of the tie bolts bonds the individual electrodes, anodes, and cathodes alternately arranged, together. An adjacent electrode pair, a cathode and an anode, are pressed together so that the sealing means is compressed. Since each cathode and anode have individual sealing means which extend about the entire periphery, the electrodes are separated by the individual sealing means and the separator which is inserted therebetween. As the electrodes are compressed together by the application of a suitable closure force, the gaskets deform in a manner which effects a fluid-tight seal between adjacent electrode frames, as well as securing the separator along both surfaces to avoid any undesired slippage.

As shown in FIG. 2, the electrodes have frames 12 having generally planar opposing surfaces between which the first sealing means, the separator and the second sealing means are compressed. The frames are generally of a thick solid construction capable of withstanding the considerable compression force exerted upon them when the filter press cell is assembled. To prevent the sealing means from "popping out" under compression, the frames should be substantially flat. To avoid the considerable expense of machining and finishing, the opposing planar surfaces are free of recesses or grooves.

Electrode frame components may be in the shape of rectangular bars, C or U channels, cylindrical tubes, elliptical tubes as well as being I-shaped or H-shaped. Preferably, the frame components are in the shape of a C channel as shown in FIGS. 2-3.

The materials of construction for frame components may be any which are resistant to corrosion by the electrolytes and the products of electrolysis. For example, metal anode frames used in the electrolysis of alkali metal chlorides are constructed of valve metals such as titanium, tantalum, or tungsten and their alloys, with titanium being preferred. Cathode frames may be constructed of metals such as iron, steel, stainless steel, nickel, or alloys of these metals may be used as well as plastic materials such as polypropylene, polybutylene, polytetrafluoroethylene, FEP, and chlorendic acid based polyesters.

The sealing means of the present invention may be used in any suitable filter press cell, the structure and function of its central components being well known to one of skill in the art. Preferred filter press electrolytic cells for employing the present invention are monopolar membrane cells in which the electrodes are oriented generally vertically. Suitable filter press monopolar membrane cells include those described in U.S. Pat. No. 4,056,458, issued Nov. 1, 1977, to G. R. Pohto et al; U.S. Pat. No. 4,210,516, issued July 1, 1980, to L. Mose et al and U.S. Pat. No. 4,217,199, issued Aug. 12, 1980, to H. Cunningham.

Hydraulically permeable or impermeable separators may be employed in the electrolytic cell of the present invention. Preferably, inert flexible separators having ion exchange properties and which are substantially impervious to the hydrodynamic flow of the electrolyte and the passage of gas products produced in the cell are employed. Suitably used are cation exchange membranes such as those composed of fluorocarbon polymers having a plurality of pendant sulfonic acid groups or carboxylic acid groups or mixtures of sulfonic acid groups and carboxylic acid groups. The terms "sulfonic acid groups" and "carboxylic acid groups" are meant to include salts of sulfonic acid or salts of carboxylic acid which are suitably converted to or from the acid groups by processes such as hydrolysis. One example of a suitable membrane material having cation exchange properties is a perfluorosulfonic acid resin membrane composed of a copolymer of a polyfluoroolefin with a sulfonated perfluorovinyl ether. The equivalent weight of the perfluorosulfonic acid resin is from about 900 to about 1600 and preferably from about 1100 to about 1500. The perfluorosulfonic acid resin may be supported by a polyfluoroolefin fabric. A composite membrane sold commercially by E. I. duPont de Nemours and Company under the trademark "Nafion" is a suitable example of this membrane.

A second example of a suitable membrane is a cation exchange membrane using a carboxylic acid group as the ion exchange group. These membranes have, for example, an ion exchange capacity of 0.5-4.0 mEg/g of dry resin. Such a membrane can be produced by copolymerizing a fluorinated olefin with a fluorovinyl carboxylic acid compound as described, for example, in U.S. Pat. No. 4,138,373, issued Feb. 6, 1979, to H. Ukihashi et al. A second method of producing the above-described cation exchange membrane having a carboxyl group as its ion exchange group is that described in Japanese Patent Publication No. 1976-126398 by Asahi Glass Kubushiki Gaisha issued Nov. 4, 1976. This method includes direct copolymerization of fluorinated olefin monomers and monomers containing a carboxyl group or other polymerizable group which can be converted to carboxyl groups. Carboxylic acid type cation exchange membranes are available commercially from the Asahi Glass Company under the trademark "Flemion".

Electrolytic cells of the present invention provide the advantages of simultaneously:
 (a) controlling gasket compression pressures;
 (b) controlling gasket frame surface structural forces;
 (c) efficiently forming a seal; and
 (d) preventing gasket slippage.
In addition, cell assembly tolerances are improved and construction costs reduced. Lower compression pressures can be employed permitting the use of smaller compression means to further reduce cell costs.

What is claimed is:
1. An electrolytic cell which comprises:
 a. a first frame member housing an electrode,
 b. a second frame member housing an electrode, c. a separator positioned between said first frame member and said second frame member, d. a first sealing means contacting a generally planar side of said first frame member and one side of said separator, said first sealing means being an elastomeric solid having a substantially rectangular cross-sectional area, e. a second sealing means contacting a generally planar side of said second frame member and contacting the other side of said separator, the second sealing means being an elastomeric solid having a substantially rectangular cross-sectional area, the initial width of said first sealing means being from about 1.1 to about 3 times the initial width of said second sealing means, and where the expanded width (W) of said second sealing means is defined by the formula:

$$W = w \div (1-c)$$

where w is the initial width, and c is from about 0.05 to about 0.55, and f. pressing means for pressing the frames together against the sealing means and the separator so as to form a substantially fluid-tight seal.

2. The electrolytic cell of claim 1 in which said first sealing means and said second sealing means have a hardness in the range of from about 20 to about 60 durometers.

3. The electrolytic cell of claim 2 in which said first sealing means and said second sealing means are gaskets.

4. The electrolytic cell of claim 3 in which said separator is hydraulically permeable.

5. The electrolytic cell of claim 3 in which said separator is a hydraulically impermeable cation exchange membrane comprised of fluorocarbon polymers having cation exchange means selected from the group consisting of sulfonic acid groups, carboxylic acid groups, and mixtures thereof.

6. The electrolytic cell of claim 3 in which said first sealing means and said second sealing means is comprised of an elastomer selected from the group consisting of chlorobutadiene, chlorosulfonated polyethylene, ethylene-propylene dimonomer, and gum rubber.

7. The electrolytic cell of claim 6 in which said first frame member houses a cathode.

8. The electrolytic cell of claim 7 in which said second frame member houses an anode and is comprised of a valve metal selected from the group consisting of titanium, tantalum, and tungsten and their alloys.

9. The electrolytic cell of claim 8 in which said initial width of said first sealing means is from about 1.3 to about 2 times said initial width of said second sealing means.

* * * * *

UNITED STATES PATENT AND TRADEMARK OFFICE
CERTIFICATE OF CORRECTION

PATENT NO. : 4,431,502

DATED : February 14, 1984

INVENTOR(S) : James M. Ford

It is certified that error appears in the above-identified patent and that said Letters Patent is hereby corrected as shown below:

Column 5, line 7, delete "3/4" and insert --3/8--.

Column 6, line 38, delete "mEg/g" and insert --mEq/g--.

Signed and Sealed this

Twenty-fourth Day of April 1984

[SEAL]

Attest:

GERALD J. MOSSINGHOFF

Attesting Officer

Commissioner of Patents and Trademarks